United States Patent
McLaughlin et al.

[11] Patent Number: 5,888,463
[45] Date of Patent: Mar. 30, 1999

[54] LI RECLAMATION PROCESS

[75] Inventors: William McLaughlin, Anaheim; Terry S. Adams, Villa Park, both of Calif.

[73] Assignee: Toxco, Anaheim, Calif.

[21] Appl. No.: 2,434

[22] Filed: Jan. 2, 1998

[51] Int. Cl.[6] .......................... C01D 15/00; F15D 17/00
[52] U.S. Cl. .............................. 423/179.5; 429/49; 62/64
[58] Field of Search .............................. 423/179.5; 62/64; 429/49

[56] References Cited

U.S. PATENT DOCUMENTS 4,637,928  1/1987  Zajac, Jr. et al. ..................... 423/179.5
5,345,033  9/1994  Mclaughlin ................................ 62/64
5,352,270  10/1994  Shackle ................................ 423/179.5

FOREIGN PATENT DOCUMENTS 5-17832  1/1993  Japan ................................ 423/179.5

*Primary Examiner*—Steven Bos
*Attorney, Agent, or Firm*—Fulwider Patton Lee & Utecht, LLP

[57] ABSTRACT

Li batteries are cryogenically cooled, comminuted and reacted with water having its pH adjusted with the addition of LiOH. The resulting salts are substantially dewatered and optionally further purified in an electrolytic cell to yield substantially uncontaminated LiOH for reuse.

8 Claims, 1 Drawing Sheet

LI RECLAMATION PROCESS

BACKGROUND OF THE INVENTION

The present invention generally relates to the reclamation of Li for recycling and more specifically pertains to the recovery of Li from discarded batteries.

Lithium batteries are used as a reliable source of electrical energy in a wide range of applications and have been in such use for a considerable period of time. At the end of lithium battery's service life, environmental concerns and economic incentives compel the recovery and reuse of the Li contained therein. The recovery of Li is, however, problematic not only due to the instability and toxicity of the metal itself, but due to the reactivity, corrosiveness and toxicity of the various by-products and intermediate compounds that may be formed during the reclamation processes. Moreover, contamination of the Li by certain substances during the processing of the Li can render the ultimate recovery of sufficiently pure Li economically unfeasible.

A number of methods have been devised in an effort to safely and efficiently reclaim lithium from batteries. Causing the cells to be substantially discharged serves to consume most of the reactive components, thus eliminating a major portion of the hazards associated with the subsequent processing. Alternatively, or in addition thereto, cryogenically cooling the battery reduces the reactivity of the various substances to a minute fraction of their reactivity at ambient temperatures. This allows disassembly and comminution to be achieved without risk of explosion or other adverse effect. Reaction of the Li and Li compounds with $H_2O$ causes salts to form which are safely and easily handled and which are readily sold to Li users including for example, battery manufacturers.

In reacting Li containing components to form the various salts, it is critical for a high pH to be maintained in order to avoid the formation of highly toxic $H_2S$. This has typically been achieved by the addition NaOH to the solution although, the concentration of Na must be strictly monitored and limited in order to avoid Na contamination in the resulting salts. Na is especially difficult to remove and inordinately high levels of Na contamination effectively render the ultimate recovery of sufficiently pure levels of Li economically unfeasible.

A method for recovering Li from batteries is therefore needed by which substantially uncontaminated Li is recovered in a safe yet more efficient manner than has heretofore been possible.

SUMMARY OF THE INVENTION

The present invention provides a method for recovering Li from lithium batteries and other Li containing scrap to yield substantially uncontaminated Li salts in a safe and economical manner.

The method first requires the Li containing scrap to be placed in liquid nitrogen to lower its temperature to levels sufficient to reduce the reactivity of the Li by many orders of magnitude. The cooled components are then comminuted into small pieces which are then placed into a high pH aqueous solution wherein the pH is controlled by the addition of LiOH. A variety of Li compounds are formed in the reaction depending upon the other compounds associated with the scrap which eventually precipitate out of solution. Such salts are subsequently forced through a filter press to yield a filter cake with reduced water content.

The salts may be further refined by subsequent dissolution in mild sulfuric acid. The resulting $Li^+$ ions are caused to pass through a membrane into a basic solution to form LiOH. The hydroxide is then either dewatered or converted to $LiCO_3$ by the addition of $CO_2$ to complete the reclamation process.

These and other features and advantages of the present invention will become apparent from the following detailed description of a preferred embodiment which, taken in conjunction with the accompanying drawing, illustrates by way of example the principles of the invention.

DETAILED DESCRIPTION OF THE PREFERRED EMBODIMENT

Figure 1:
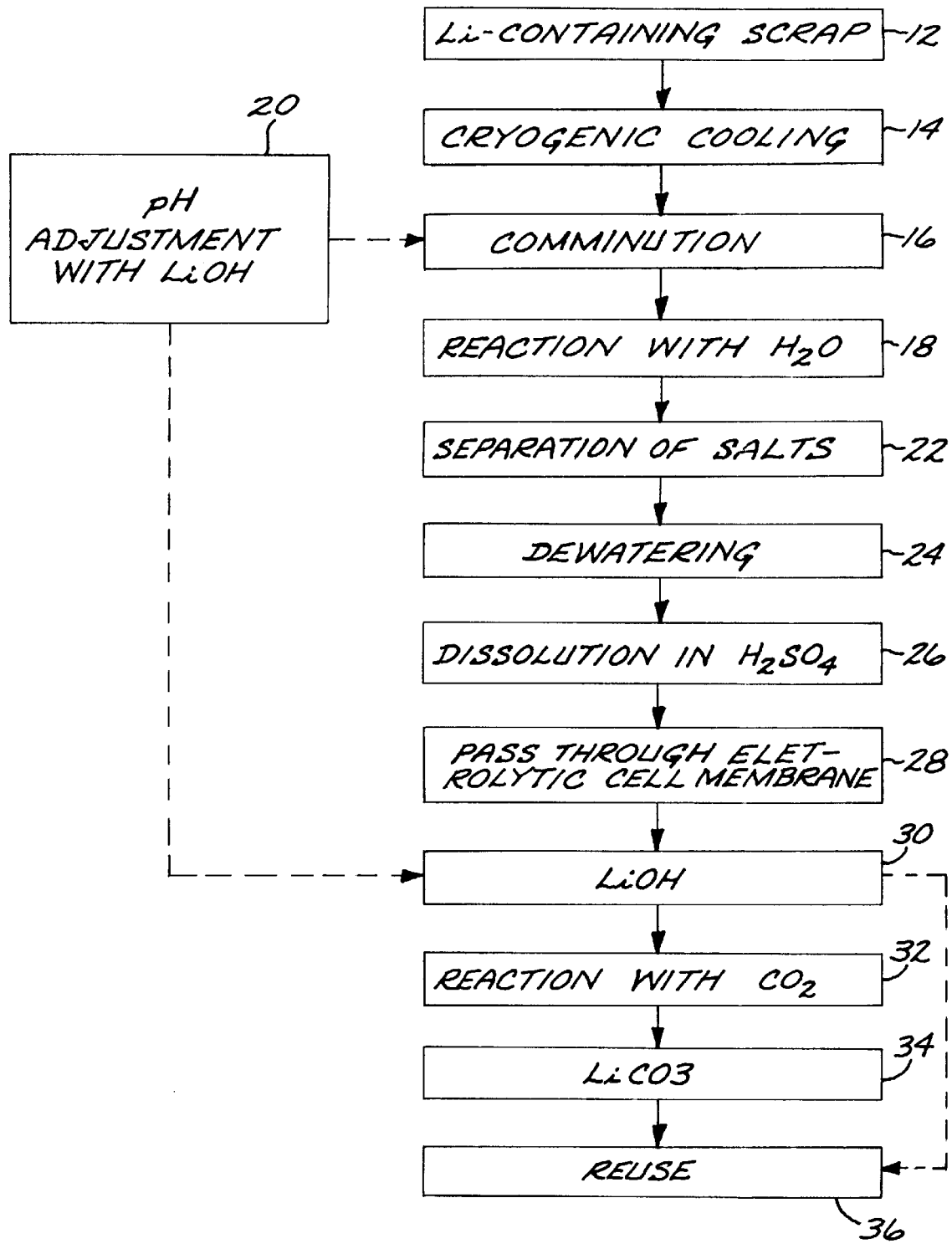
FIG. 1 is a flow chart of the recovery method of the present invention.

The present invention is employed to safely and economically recover Li in the form of certain useful Li salts from Li containing scrap. The resulting salts are useable in for example, the manufacture of new batteries. The method is especially well suited to the processing of discarded lithium batteries. FIG. 1 generally illustrates the individual steps in the process.

Li batteries 12, are collected and delivered to the reclamation site where the batteries are optionally discharged such as by immersion in salt water or use of ohmic resistors. The batteries are then submerged in liquid nitrogen 14 to lower their temperature to about −320° F. thereby reducing the reactivity of the Li by 5 to 6 orders of magnitude when compared to its reactivity at room temperature. The mass and configuration of the batteries or battery components determine the time needed to achieve adequate cooling. Thin lithium metal strips cool sufficiently in a matter of minutes while a 2½ pound battery might require two hours. A 570 pound battery must remain submerged for about eight hours and requires a significant amount of the liquid nitrogen to be replenished during such time.

Once the battery and battery components are sufficiently cooled, they are removed from the liquid nitrogen and comminuted. Comminutation 16 is preferably achieved with the use of a shredder or hammer mill wherein force is applied by crushing and tearing. The resulting pieces are fairly uniform in overall size and are about one inch in diameter. The small size and uniformity of the pieces provides for easier handling and results in more uniform reactivity rates in the subsequent processing step.

The shredded components are introduced into a reaction tank wherein the Li containing materials are reacted with water 18. In order to prevent the formation of highly toxic $H_2S$, the pH of the reaction water is raised to at least 10 with the addition of LiOH 20. By using LiOH rather than the commonly available and substantially less expensive NaOH, Na contamination in the ultimately recovered Li compounds is thereby eliminated and their value substantially enhanced.

A variety of lithium salts are formed in the reaction tanks depending upon battery chemistry including but not limited to LiCl, $LiCO_3$, $LiSO_3$. Such salts increase in concentration until the solution becomes supersaturated and the salts precipitate. The precipitate is periodically pumped out 22 to a settling tank from where it is periodically collected and forced through a filter press 24. The resulting filter cake has a typical moisture content of about 28%. Additionally, the $H_2$ generated during the reaction is ignited on the surface of the water to form water vapor.

In order to further purify the salts, and in particular, to remove the undesirable sulfides, the filter cake is placed in a hybrid electrolytic cell containing dilute sulfuric acid. The salts dissolve 26 thereby separating $Li^+$ ions from the various anionic components including $SO_3$. The $Li^+$ ions pass 28 through a membrane while the anions are repelled. On the basic side, LiOH 30 is formed some of which is employed in adjusting the pH of the reaction tanks. The LiOH is either subsequently dewatered or converted to $LiCO_3$ 34 by the addition of $CO_2$ 32 wherein $CO_2$ is bubbled through solution. The LiOH or $LiCO_3$ is finally dried in a thermal dryer and packaged for shipment. The process provides for a recovery efficiency of Li ions of about 97%. The recovered Li is suitable for reuse 36 in a variety of applications.

While a particular form of the invention has been illustrated and described, it will also be apparent to those skilled in the art that various modifications can be made without departing from the spirit and scope of the invention. More particularly, this invention is not limited to the recovery of Li from a particular source of Li, as discarded batteries only serve as an example. Additionally, a wide variety of techniques may be employed to cool and comminute the Li containing components while various filtering and dewatering methods are easily adaptable to the present process. Accordingly, it is not intended that the invention be limited except by the appended claims.

What is claimed is:

1. A process for recovering Li from Li containing wastes, comprising the steps of:

cooling the Li containing waste to substantially cryogenic temperatures;

comminuting the cooled Li containing waste;

reacting the cooled and comminuted Li containing waste with water to form Li salts in the water;

maintaining the pH of said water sufficiently high to prevent the formation of $H_2S$, with the addition of LiOH thereto; and separating Li salts formed by the reaction of the Li containing waste with water.

2. The process of claim 1 wherein a pH of 10 is maintained.

3. The process of claim 1 wherein said Li containing waste comprises Li batteries.

4. The process of claim 1 wherein said waste is cooled by immersion in liquid $N_2$.

5. The process of claim 1 further comprising the step of dissolving said salt in a $H_2SO_4$ solution.

6. The process of claim 5 further comprising the step of passing the dissolved salts through an electrolytic cell to yield LiOH.

7. The process of claim 6 wherein a portion of said LiOH is added to the water in which said cooled Li containing waste is reacted in order to maintain said pH sufficiently high.

8. The process of claim 6 wherein said LiOH is reacted with $CO_2$ to form $LiCO_3$.

* * * * *